(12) United States Patent
An et al.

(10) Patent No.: US 12,028,269 B2
(45) Date of Patent: Jul. 2, 2024

(54) METHOD FOR OPTIMAL RESOURCE SELECTION BASED ON AVAILABLE GPU RESOURCE ANALYSIS IN LARGE-SCALE CONTAINER PLATFORM

(71) Applicant: Korea Electronics Technology Institute, Seongnam-si (KR)

(72) Inventors: Jae Hoon An, Incheon (KR); Young Hwan Kim, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 17/983,770

(22) Filed: Nov. 9, 2022

(65) Prior Publication Data
US 2023/0155958 A1 May 18, 2023

(30) Foreign Application Priority Data
Nov. 12, 2021 (KR) .................. 10-2021-0155559

(51) Int. Cl.
*H04L 47/783* (2022.01)
(52) U.S. Cl.
CPC .................. *H04L 47/783* (2013.01)
(58) Field of Classification Search
CPC ... G06F 9/50; G06F 8/36; G06F 9/451; G06F 16/9577; G06F 9/505; G06F 9/5011; G06F 9/5027; G06F 9/54; G06F 9/541; G06F 2209/503; G06F 9/5066; G06F 9/5077; G06F 11/3433; G06F 8/433; G06F 8/454; G06F 8/47; G06F 8/72; G06F 9/45516; G06F 9/5038; G06F 9/5044; G06F 11/2236; G06F 11/2273; G06F 11/261; G06F 2009/45562; G06F 2009/4557; G06F 2209/501; G06F 2209/5011; G06F 3/0605; G06F 3/0631; G06F 3/067; G06F 8/4443; G06F 9/3836; G06F 9/44; G06F 9/455; G06F 9/45558; G06F 9/5061;
(Continued)

(56) References Cited

U.S. PATENT DOCUMENTS 11,310,342 B1 * 4/2022 Frey .................... H04L 67/1012
2017/0132747 A1 * 5/2017 Wilt ........................ G06F 9/445
(Continued)

FOREIGN PATENT DOCUMENTS

KR 10-2140730 B1 8/2020
KR 10-2260547 B1 6/2021

OTHER PUBLICATIONS

Korean Office Action Issued on Nov. 10, 2023, in counterpart Korean Patent Application No. 10-2021-0155559 (3 Pages in English, 4 pages in Korean).

*Primary Examiner* — Djenane M Bayard
(74) *Attorney, Agent, or Firm* — NSIP Law

(57) ABSTRACT

There are provided a method and an apparatus for cloud management, which selects optimal resources based on graphic processing unit (GPU) resource analysis in a large-scale container platform environment. According to an embodiment, a GPU bottleneck phenomenon occurring in an application of a large-scale container environment may be reduced by processing partitioned allocation of GPU resources, rather than existing 1:1 allocation, through real-time GPU data analysis (application of a threshold) and synthetic analysis of GPU performance degrading factors.

17 Claims, 11 Drawing Sheets

(58) Field of Classification Search
CPC ....... G06F 9/5072; H04L 67/02; H04L 67/04; H04L 67/53; H04L 47/783; H04L 67/63; H04L 41/147; H04L 41/5009; H04L 67/1008; H04L 12/16; H04L 12/66; H04L 41/0894; H04L 41/14; H04L 41/16; H04L 43/065; H04L 43/0817; H04L 43/0864; H04L 43/091; H04L 43/16; H04L 45/124; H04L 67/1023; H04L 41/0246; H04L 41/042; H04L 41/0816

See application file for complete search history.

(56) References Cited

U.S. PATENT DOCUMENTS

| | | | |
|---|---|---|---|
| 2019/0155660 A1* | 5/2019 | McQuighan | G06F 9/5022 |
| 2022/0179718 A1* | 6/2022 | Chawla | G06F 9/5077 |
| 2022/0188965 A1* | 6/2022 | Li | G06F 9/5077 |
| 2023/0102063 A1* | 3/2023 | Wong | G06F 9/505 |
| | | | 718/102 |

* cited by examiner

METHOD FOR OPTIMAL RESOURCE SELECTION BASED ON AVAILABLE GPU RESOURCE ANALYSIS IN LARGE-SCALE CONTAINER PLATFORM

CROSS-REFERENCE TO RELATED APPLICATION(S) AND CLAIM OF PRIORITY

This application is based on and claims priority under 35 U.S.C. § 119 to Korean Patent Application No. 10-2021-0155559, filed on Nov. 12, 2021, in the Korean Intellectual Property Office, the disclosure of which is herein incorporated by reference in its entirety.

BACKGROUND

Field

The disclosure relates to a method and an apparatus for cloud management, and more particularly, to a method and an apparatus for cloud management, which selects optimal resources based on graphic processing unit (GPU) resource analysis in a large-scale container platform environment.

Description of Related Art

In a large-scale container platform environment, there may be a problem that it is difficult to maximize a utilization rate of a GPU container where a GPU I/O bottleneck occurs according to a request for operation of various applications.

In addition, in an existing large-scale container environment, GPU resources which are required to operate an application for big data analysis and learning may be allocated separately like a 1:1 allocation method, and technological support of GPUDirect, GPU Sharing, etc. for efficient utilization of GPU resources in a large-scale container environment is inadequate, and accordingly, there is a demand for a method for solving this problem.

In addition, technology for multilateral GPU resource monitoring and analysis to distribute GPU resources in a large-scale container environment is also incomplete, and there is a demand for a method for solving this problem.

SUMMARY

To address the above-discussed deficiencies of the prior art, it is a primary object of the disclosure to provide a method and an apparatus for cloud management, which can process partitioned allocation of GPU resources, rather than existing 1:1 allocation, through real-time GPU data analysis (application of a threshold value) and synthetic analysis of GPU performance degrading factors.

Another object of the disclosure is to provide a method and an apparatus for cloud management, which can efficiently distribute GPU resources through multilateral (multi-dimensional) data (metric) analysis and simultaneous analysis of use rates of a GPU configuration node and a GPU using application (pod), and can support a deployment history information management function for rapid distribution of GPU resources and reduction of performance degrading factors, and can automatically update and manage weight data by recording a time of really performing deployed resources.

According to an embodiment of the disclosure to achieve the above-described objects, a cloud management method includes: collecting, by a cloud management device, metric data regarding a GPU use state in a large-scale container platform environment; generating, by the cloud management device, a GPU map by analyzing the collected metric data; and performing, by the cloud management device, a scheduling operation for distributed deployment of GPU resources, based on the generated GPU map.

In addition, performing the scheduling operation may include: detecting an overload pod performance of which is degraded due to a reduced speed or lack of resources, based on the generated GPU map; recording information regarding the detected overload pod; selecting an optimal candidate node for allocating all resources or sharing and allocating some of the resources of the overload pod, in replacement of the overload pod, based on the generated GPU map; and performing the scheduling operation, based on the recorded information regarding the overload pod and information regarding the optimal candidate node.

In addition, when selecting the optimal candidate node, the cloud management device may select one or more first nodes to which requested GPU resources are allocable, may calculate an appropriate score with respect to the selected first node, and may select a most appropriate node based on each appropriate score.

In addition, the cloud management device may detect occurrence of overload with respect to all pods registered at the GPU map periodically according to a pre-set first period, and, when a new pod is generated, may detect occurrence of overload with respect to the generated pod irrespective of whether the first period comes.

In addition, the cloud management device may iteratively perform the scheduling operation of GPU resources, based on the generated GPU map, periodically according to a pre-set second period, and the second period may be relatively longer than the first period, so that the scheduling operation of GPU resources is performed based on information on the overload pod that is accumulatively recorded.

In addition, when selecting the first node, the cloud management device may calculate a number of available GPUs for each node, and may predict a memory usage of each pod included in each node, based on the metric data, and may select the first node to which the requested GPU resources are allocable, based on the calculated number of available GPUs for each node and a result of predicting the memory usage of each pod.

In addition, when selecting the optimal candidate node, the cloud management device may, as the optimal candidate node first, a first node included in a node having a smallest number of pods participating in allocation of GPU resources, among nodes to which a first node corresponding to a pre-set upper range of appropriate scores belongs.

In addition, the cloud management device may select a second node having a history of failing to schedule, and may perform a rescheduling operation of GPU resources with respect to the selected second node periodically according to a pre-set third period.

In addition, after the scheduling operation is performed, when there is a difference between a prediction value obtained before the scheduling operation and a real value obtained after the scheduling operation by comparing, the cloud management device may add a weight to a prediction value of a next period of a pod in which the difference occurs, by a difference value.

According to another embodiment of the disclosure, a computer-readable recording medium has a computer program recorded thereon to perform a cloud management method, the method including: collecting, by a cloud management device, metric data regarding a GPU use state in a large-scale container platform environment; generating, by the cloud management device, a GPU map by analyzing the collected metric data; and performing, by the cloud management device, a scheduling operation for distributed deployment of GPU resources, based on the generated GPU map.

In addition, according to another embodiment of the disclosure, a cloud management device includes: a communication unit configured to collect metric data regarding a GPU use state in a large-scale container platform environment; and a processor configured to generate a GPU map by analyzing the collected metric data, and to perform a scheduling operation for distributed deployment of GPU resources, based on the generated GPU map.

In addition, according to another embodiment of the disclosure, a cloud management system includes: a cloud platform including a plurality of clusters; and a cloud management device configured to collect metric data regarding a GPU use state in a large-scale container platform environment, to generate a GPU map by analyzing the collected metric data, and to perform a scheduling operation for distributed deployment of GPU resources, based on the generated GPU map.

As described above, a GPU bottleneck phenomenon occurring in an application operating in a large-scale container environment may be reduced by processing partitioned allocation of GPU resources, rather than existing 1:1 allocation, through real-time GPU data analysis (application of a threshold) and synthetic analysis of GPU performance degrading factors.

In addition, GPU resources may be efficiently distributed through multilateral (multi-dimensional) data (metric) analysis and simultaneous analysis of use rates of a GPU configuration node and a GPU using application (pod), and a deployment history information management function for rapid distribution of GPU resources and reduction of performance degrading factors may be supported, and weight data may be automatically updated and managed through record of a time of really performing deployed resources.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Figure 1:
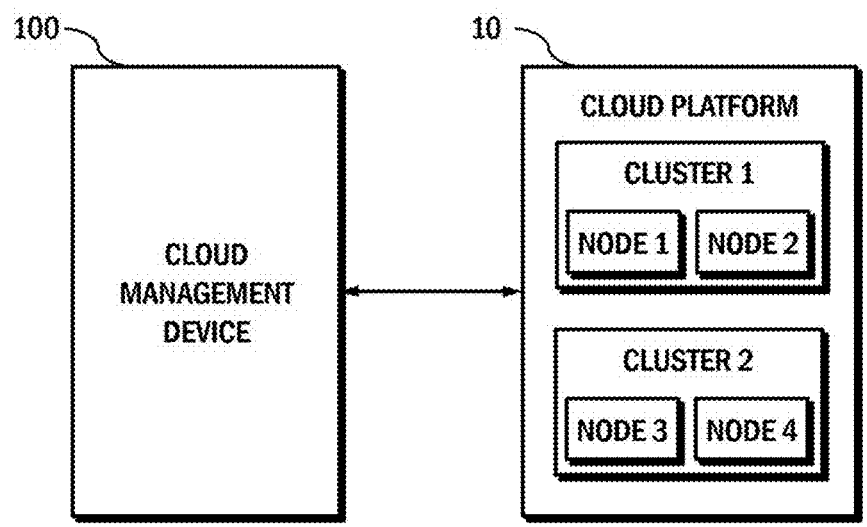
FIG. 1 is a view provided to explain a configuration of a cloud system according to an embodiment of the disclosure.

FIG. 1 is a view provided to explain a configuration of a cloud system according to an embodiment of the disclosure.

The cloud system according to an embodiment may be provided to process partitioned allocation of GPU resources, rather than existing 1:1 allocation, through real-time GPU data analysis and synthetic analysis of GPU performance degrade factors in a cloud platform environment.

To achieve this, in the cloud system, a cloud platform 10 may be managed by a cloud management device 100 as shown in FIG. 1.

Specifically, in order to process partitioned allocation of GPU resources, rather than existing 1:1 allocation, through real-time GPU data analysis and synthetic analysis of GPU performance degrading factors in a cloud platform environment, the cloud management device 100 may collect metric data regarding a GPU use state, may generate a GPU map by analyzing the collected metric data, and may perform a scheduling operation for distributed deployment of GPU resources, based on the generated GPU map.

Herein, the cloud management device 100 may be implemented by a physically independent device, or may be implemented to be included in a certain device, system or cloud as a part, and may be implemented in the form of software like a program, a platform, a framework or an application installed in a smartphone, a computer, a server, or a cloud. In addition, respective components of the cloud management device 100 may be implemented by physical components or components in the form of a function of software.

The cloud platform 10 is a platform that is configured by a plurality of servers and provides a cloud service through virtualization, and may be implemented by Docker, Kubernetes, etc., and may be established in a distributed, collaborative container platform environment.

As shown in FIG. 1, the cloud platform 10 may include a plurality of clusters, and one cluster may include a plurality of nodes, and the node may include at least one pod.

Herein, the cluster is a plurality of servers which are virtualized to look like one server, and may be positioned by regions. Specifically, the cloud platform 10 of FIG. 1 may include cluster 1 and cluster 2, and cluster 1 and cluster 2 may be positioned in different regions and zones.

Herein, the region may refer to a continent and the zone may refer to a country.

In addition, one cluster may include a plurality of nodes. The node indicates a server unit based on which a real service (or container) is executed. The node may perform a role of generating a service and managing a service state, and may include a plurality of pods.

The cloud platform 10 of the above-described structure may perform a function of allocating resources for executing a specific service to a node that is determined by the cloud management device 100.

In addition, the cloud management device 100 may perform a function of a master of managing all clusters. All commands are to invoke an application programming interface (API) server 122 of the cloud management device 100, which is a master, and the node may perform a necessary operation while communicating with the cloud management device 100. When a command is issued for a container of a specific node or a log is retrieved, the command may be transmitted to the cloud management device 100, rather than being directly transmitted to the node, and the cloud management device 100 may access the node and may respond with a result instead.

Figure 2:
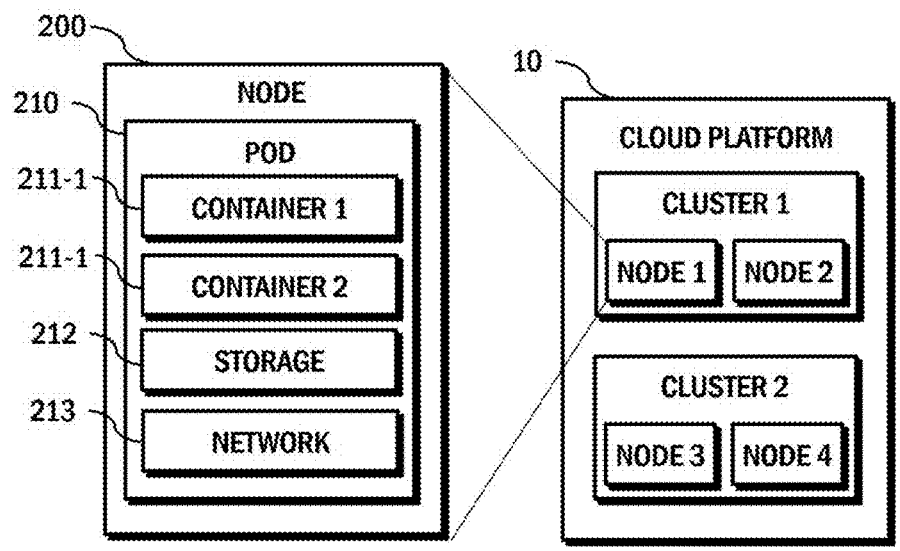
FIG. 2 is a view provided to explain a detailed configuration of a cloud platform according to an embodiment of the disclosure.

The node may include at least one pod. A structure of the node of the above-described structure will be described in more detail with reference to FIG. 2. FIG. 2 is a view illustrating a detailed configuration of the cloud platform 10 according to an embodiment.

As shown in FIG. 2, the cloud platform 10 may include a plurality of nodes 200, and the node may include at least one pod 210.

The node 200 may generate a necessary pod 210 and may set a network 215 and a storage 213 while communicating with the cloud management device 100.

The pod 210 is the smallest deployment unit and is where real containers are generated. The pod 210 may be generated and managed by a controller or a ReplicaSet, and may be expanded to hundreds of pods or thousands of pods. The pod 210 may be labeled to define its own using purpose (specialized for a graphic processing unit (GPU), a solid state drive (SSD) server). The pod 210 is the smallest unit deployed by Kubernetes, and has attributes of one or more containers 211, a storage 213, and a network 215. At least one container 211 included in the pod 210 may share the storage 213 and the network 215 with each other, and may access a local host with each other.

The cloud platform 10 includes the plurality of clusters, the plurality of nodes, and the plurality of pods of the above-described structures.

Figure 3:
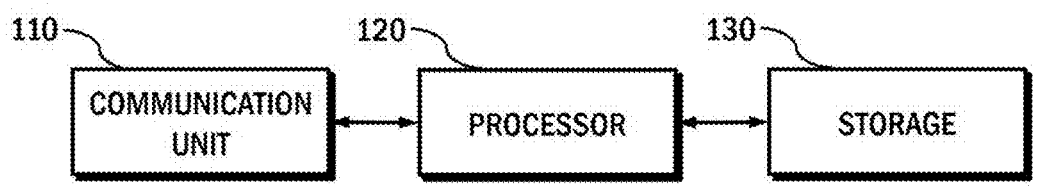
FIG. 3 is a view provided to explain a detailed configuration of a cloud management device according to an embodiment of the disclosure.

Hereinafter, a configuration of the cloud management device 100 will be described in more detail with reference to FIG. 3. FIG. 3 is a view illustrating the cloud management device 100 according to an embodiment.

As shown in FIG. 3, the cloud management device 100 may include a communication unit 110, a processor 120, and a storage 130.

The communication unit 110 may be connected to be able to communicate with the cloud platform 10, and may receive a resource allocation request for a specific service. Herein, the resource allocation request for the specific service may include information regarding resources necessary for the corresponding service, and specifically, the resource allocation request for the specific service may include at least one of API version information, type information, label information, CPU requirements, memory requirements, storage requirements, policy information, restriction to the number of times disorder occurs, and regional information. In addition, the resource allocation request for the specific service may further include information regarding a weight for each type of resource.

The communication unit 110 may be a communication means for exchanging data necessary for operations of the processor 120, and may perform communication wirelessly or wiredly.

For example, the communication unit 110 may collect metric data regarding a GPU use state.

The storage 130 may store a program and data necessary for operations of the processor 120.

The processor 120 may control overall operations of the cloud management device 100.

Specifically, the processor 120 may generate a GPU map by analyzing the collected metric data, and may perform a scheduling operation for distributed deployment of GPU resources, based on the generated GPU map.

For example, the processor 120 may be provided with a GPU scheduler 121 therein, and may detect an overload pod the performance of which is degraded due to reduction of speed or lack of resources, based on the generated GPU map, may record information on the detected overload pod on the storage 130, may select an optimal candidate node for allocating all resources or for sharing and allocating some of the resources of the overload pod, in replacement of the overload pod, based on the generated GPU map, and may perform a scheduling operation based on the recorded information of the overload pod and information on the optimal candidate node.

Figure 4:
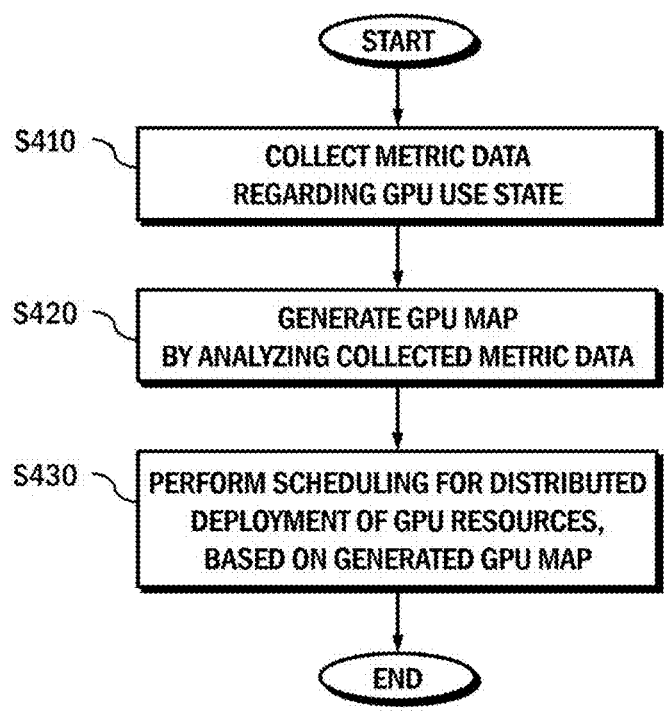
FIG. 4 is a view provided to explain a cloud management method according to an embodiment of the disclosure.

FIG. 4 is a view provided to explain a cloud management method according to an embodiment.

The cloud management method according to the present embodiment may be executed by the cloud management device described with reference to FIG. 3.

Referring to FIG. 4, the cloud management method may collect metric data regarding a GPU use state in a large-scale container platform environment by using the cloud management device (S410), may generate a GPU map by analyzing the collected metric data (S420), and may perform a scheduling operation for distributed deployment of GPU resources, based on the generated GPU map.

Figure 5:
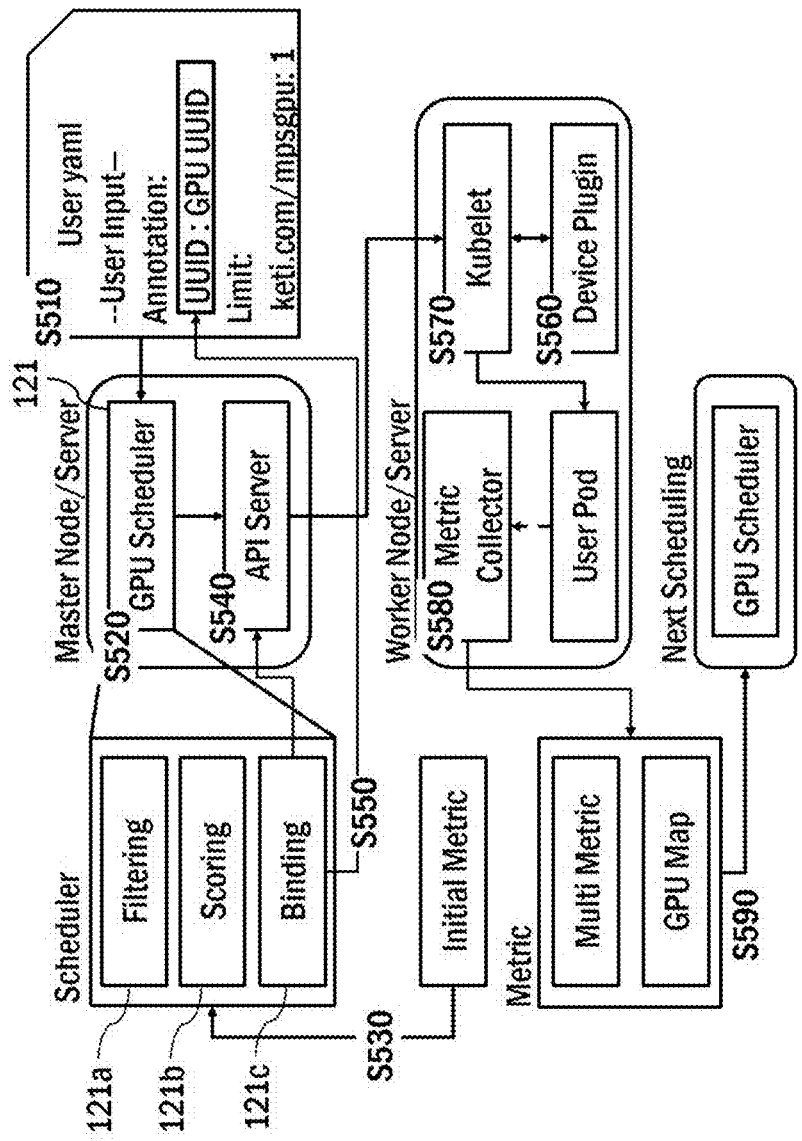
FIG. 5 is a view provided to explain the cloud management method in more detail according to an embodiment of the disclosure.

FIG. 5 is a view provided to explain the cloud management method in more detail according to an embodiment.

Referring to FIG. 5, when a user makes a request for allocation of GPU resources to support a specific service (S510), the cloud management method may perform an initial scheduling operation for requested allocation of GPU resources through the GPU scheduler 121 (S520), and may iteratively perform the scheduling operation of the GPU resources periodically according to a pre-set period, based on the generated GPU map.

In this case, the GPU scheduler 121 may include a filtering module 121*a* to select a pod to which GPU resources are allocable, a scoring module 121*b* to select an optimal candidate node for allocating all resources or for sharing and allocating some of the resources of an overload pod, in replacement of the overload pod, among the pods to which GPU resources are allocable, based on the generated GPU map, and a binding module 121*c* to perform the scheduling operation, based on recorded information of the overload pod and information on the optimal candidate node.

The GPU scheduler 121 may perform the scheduling operation by utilizing initial metric data during the initial scheduling operation (S530), may generate a GPU map on which a current state of distributed deployment (deployment information) of GPU resources, which is generated as a result of the scheduling operation, is recorded, and may transmit the GPU map to the API server 122 (S540), and may transmit a universally unique identifier (UUID) of a node and a pod in which GPU resources are deployed to a user device (S550).

The API server 122 may transmit GPU deployment information to a device plug-in module provided in a worker node (S560).

When a Kubelet generates a user pod (S570), the GPU scheduler 121 may collect GPU metric data reflecting a node including the generated user pod and the user pod through the communication unit 110 (S580), and may use the GPU metric data in the next scheduling operation (S590).

Herein, the Kubelet may be an agent that is executed in each node of a cluster, and may perform a role of managing a container to surely operate in the pod.

Figure 6:
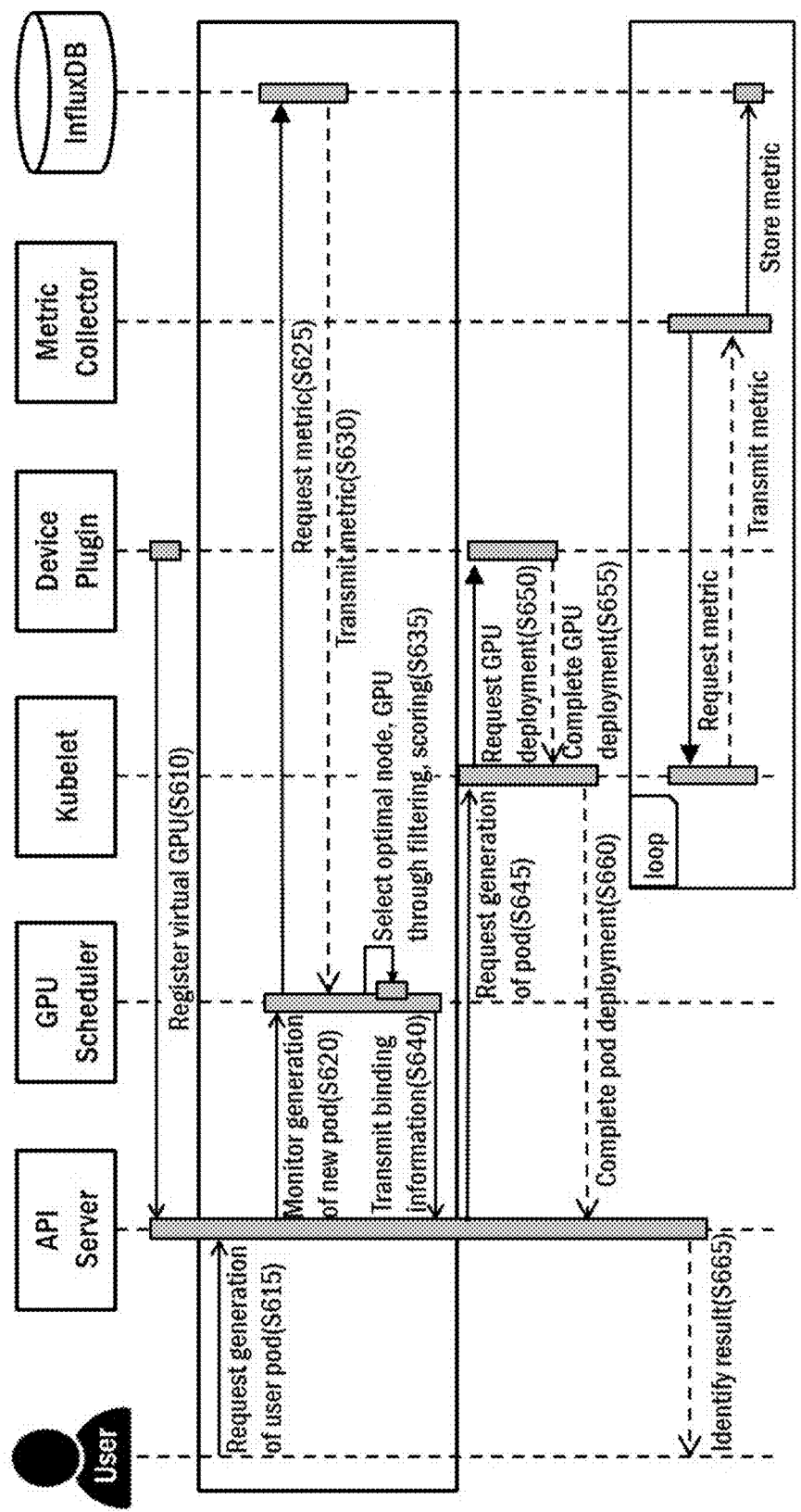
FIG. 6 is a view provided to explain a process of generating a GPU map in the cloud management method according to an embodiment of the disclosure.

FIG. 6 is a view provided to explain a process of generating a GPU map in the cloud management method according to an embodiment.

Referring to FIG. 6, the cloud management method may register a virtual GPU at the API server 122 through the device plug-in module (S610), and, when a user requests generation of a user pod (S615), the API server 122 may request the GPU scheduler 121 to monitor generation of a new pod (S620).

The GPU scheduler 121 may request metric data regarding a GPU use state from an Influx DB of the storage 130 (S625), and, when the metric data regarding the GPU use state is received from the Influx DB (S630), the GPU scheduler 121 may select an optimal candidate node through a filtering operation and a scoring operation (S635).

For example, the GPU scheduler 121 may select a node to which requested GPU resources are allocable, based on the metric data regarding the GPU use state, when performing the filing operation.

Specifically, when selecting a first node, the GPU scheduler 121 may calculate the number of available GPUs for each node, and may predict a memory usage of each pod included in each node, based on the metric data, and may select the first node to which requested GPU resources are allocable, based on the calculated number of available GPUs for each node and a result of predicting the memory usage of each pod.

In addition, the GPU scheduler 121 may calculate an appropriate score with respect to the node that is selected as being allocable requested GPU resources, as a result of performing the filtering operation.

Information on the optimal candidate node selected through the GPU scheduler 121 may be transmitted to the API server 122 (S640), and the API server 122 may request the Kubelet to generate a new pod for the node selected as the optimal candidate node, based on the information on the optimal candidate node (S645), and the Kubelet may request the device plug-in module to deploy GPU resources in the newly generated pod (S650).

When GPU resources are deployed in the newly generated pod by the device plug-in module (S655), the Kubelet may transmit information on the pod in which the GPU resources are deployed to the API server 122, thereby completing deployment of the pod in which the GPU resources are deployed (S660), and the API server 122 may transmit a result of the deployment to a user device (S665).

In this case, when the Kubelet receives a request for metric data regarding the GPU use state from the metric collector, the Kubelet may transmit the metric data regarding the GPU use state, and the metric data may be stored in the influx DB.

Figure 7:
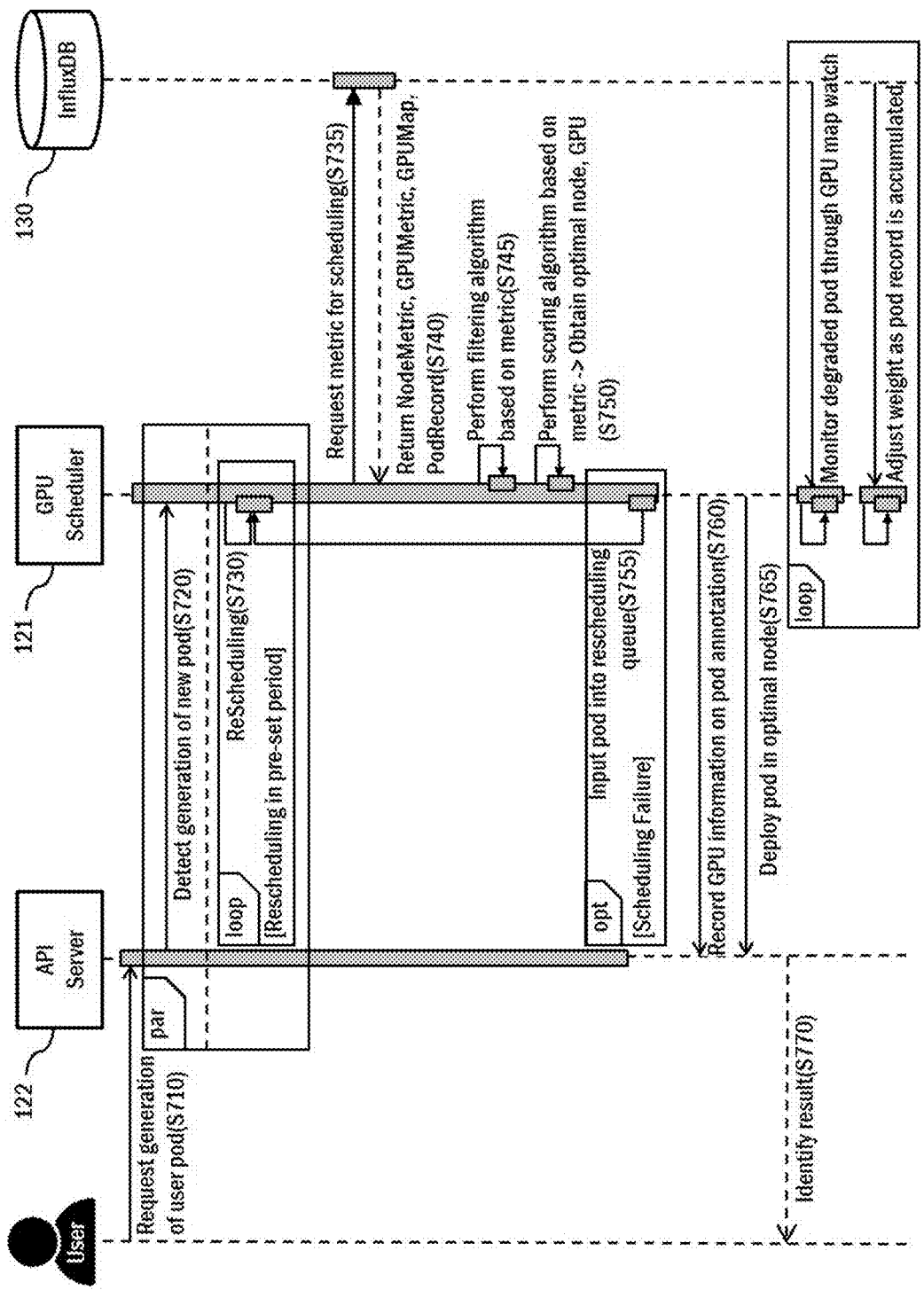
FIG. 7 is a view provided to explain a process of iteratively performing a scheduling operation of GPU resources in the cloud management method according to an embodiment of the disclosure.

FIG. 7 is a view provided to explain a process of iteratively performing a scheduling operation of GPU resources in the cloud management method according to an embodiment.

Referring to FIG. 7, according to the cloud management method, when generation of a new pod is requested by a user device through the API server 122 (S710), the API server 122 may detect the request for generation of the new pod (S720).

In this case, the cloud management device may iteratively perform a scheduling operation of GPU resources, based on a generated GPU map, periodically according to a pre-set second period, through the GPU scheduler (S730). Herein, the second period may be relatively longer than a first period, which will be described below, so that the scheduling operation of the GPU resources is performed based on information on an overload pod that is accumulatively recorded.

Figure 8:
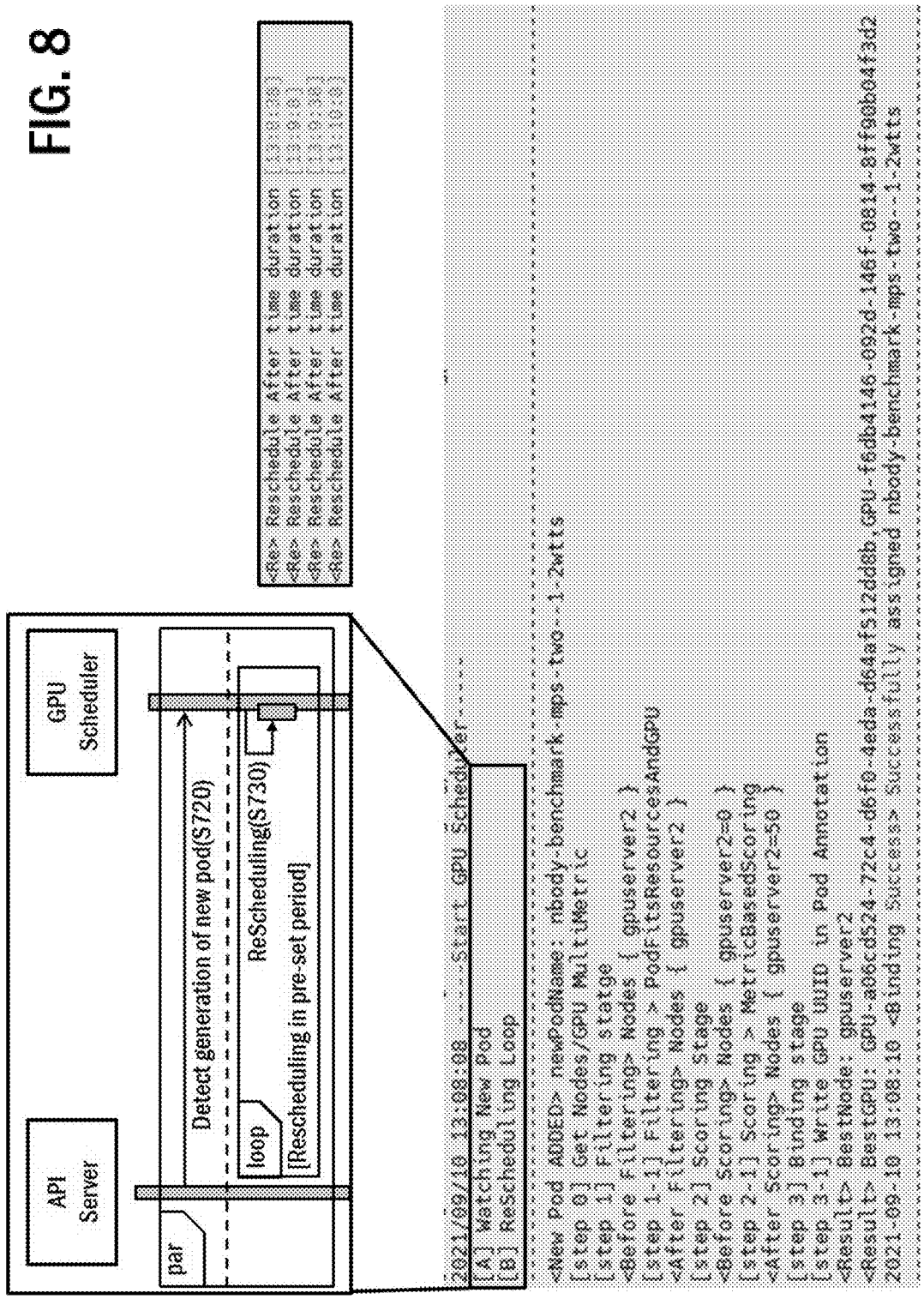
FIG. 8 is a view illustrating an example of a source code created to apply a routine for monitoring whether a new pod is generated.

The GPU scheduler 121 may detect occurrence of overload with respect to all pods registered at the GPU map periodically according to the pre-set first period, and, when a new pod is generated, the GPU scheduler 121 may detect occurrence of overload with respect to the generated pod, irrespective of whether the first period comes, as shown in FIG. 8. FIG. 8 illustrates an example of a source code created to apply a routine for monitoring whether a new pod is generated.

That is, the GPU scheduler 121 may continuously monitor whether a new pod is generated, and, when the new pod is generated, may detect occurrence of overload with respect to the generated pod irrespective of whether the first period comes.

Figure 9:
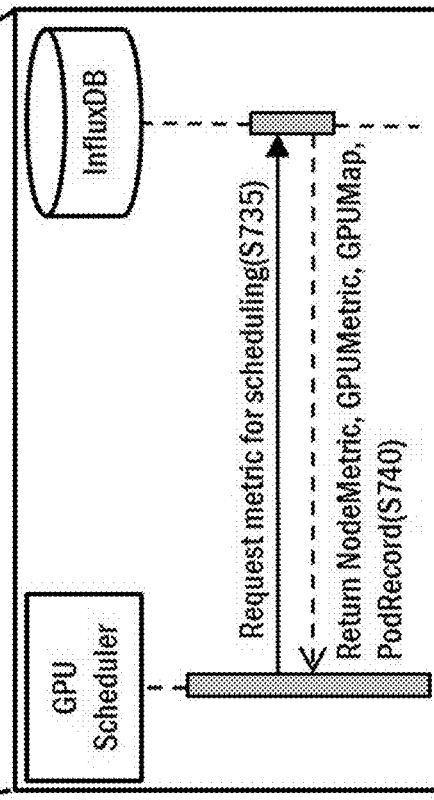
FIG. 9 is a view illustrating an example of a source code created to acquire metric data of a node and a GPU from an influx DB of a storage to perform a scheduling operation.

In addition, the GPU scheduler 121 may request metric data regarding a GPU use state from the influx DB in order to perform a scheduling operation (S735), and may receive the metric data regarding the GPU use state from the influx DB (S740). Herein, FIG. 9 is a view illustrating an example of a source code created to acquire metric data of a node and a GPU in the influx DB of the storage 130 in order to perform a scheduling operation.

In this case, the metric data regarding the GPU use state may include NodeMetric, GPUMetric, GPUMap, PodRecord, etc.

Figure 10:
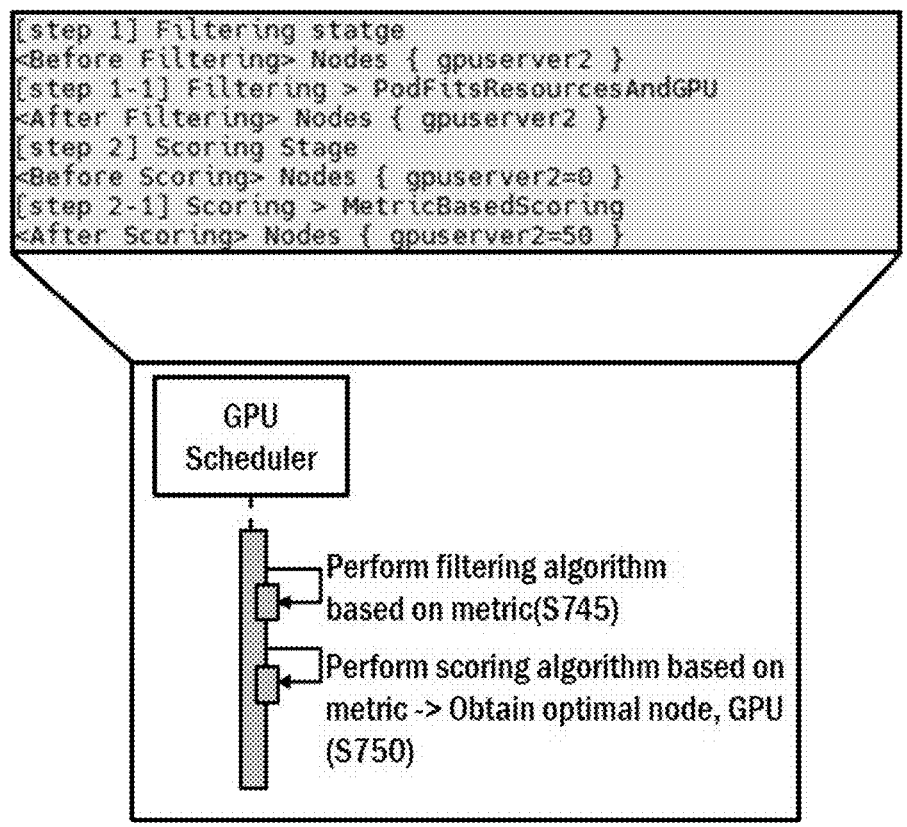
FIG. 10 is a view illustrating an example of a source code created to operate a filtering module and a scoring module.

The GPU scheduler 121 may select an optimal candidate node through a filtering operation and a scoring operation. FIG. 10 is a view illustrating an example of a source code created to operate a filtering module and a scoring module.

For example, the GPU scheduler 121 may select one or more first node to which requested GPU resources are allocable in order to select the optimal candidate node when performing the filtering operation (S745).

Specifically, when selecting the first node, the GPU scheduler 121 may calculate the number of available GPUs for each nod, and may predict a memory usage of each pod included in each node, based on the metric data, and may select the first node to which the requested GPU resources are allocable, based on the calculated number of available GPUs for each node and a result of predicting the memory usage of each pod.

In addition, the GPU scheduler 121 may calculate an appropriate score with respect to the selected first node, and may select a most appropriate node based on each appropriate score (S750).

Specifically, when selecting the optimal candidate node, the GPU scheduler 121 may select, as the optimal candidate node first, a first node that is included in nodes having the smallest number of pods participating in GPU resource allocation, among nodes to which the first node corresponding to a pre-set upper range of appropriate scores belongs.

When the optimal candidate node is selected, the GPU scheduler 121 may generate a new pod in the node selected as the optimal candidate node, and may deploy the newly generated pod in a rescheduling queue in order to deploy GPU resources in the newly generated pod (S755).

Figure 11:
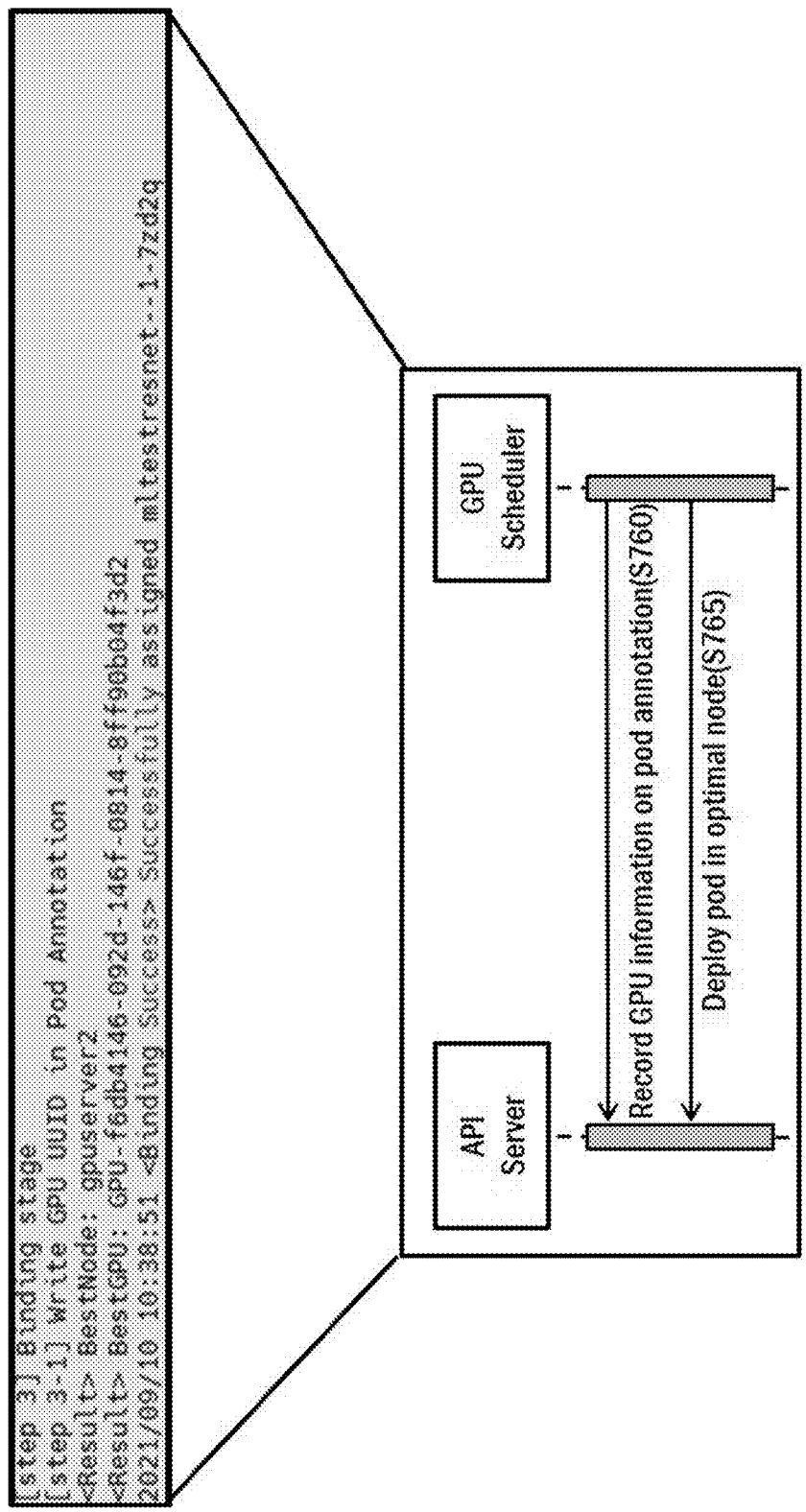
FIG. 11 is a view illustrating an example of a source code created to record GPU information selected as a result of scheduling.

In addition, the GPU scheduler 121 may transmit the GPU use state and GPU information to be rescheduled to the API server 122 (S760), and may allow GPU resources to be deployed in the newly generated pod (S765), and the API server 122 may transmit a result of deploying resources to the user device (S770). Herein, FIG. 11 is a view illustrating an example of a source code created to record GPU information which is selected as a result of scheduling.

Figure 12:
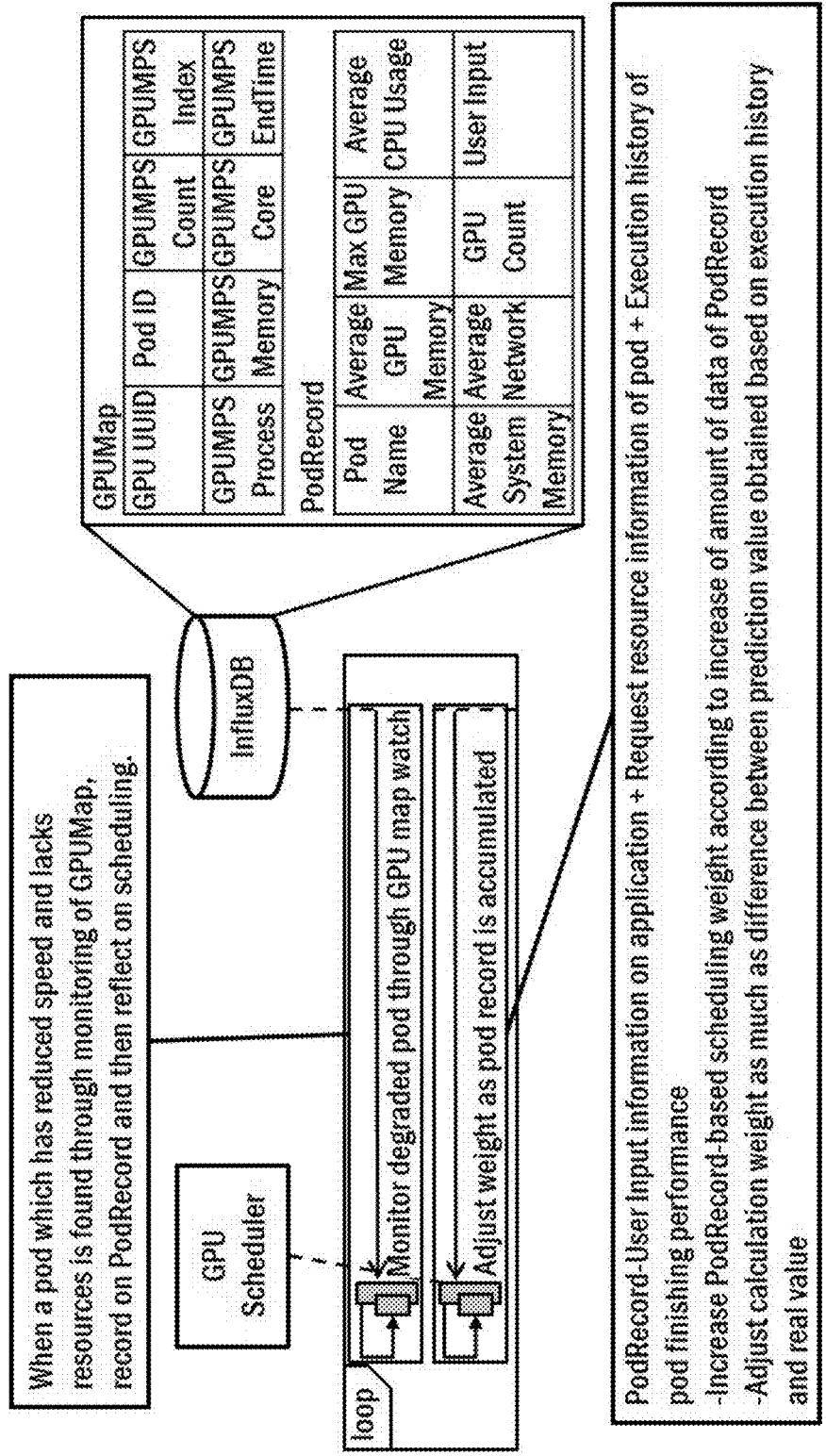
FIG. 12 is a view illustrating an example of a source code created to record information on an overload pod when the overload pod is found based on a GPU map.

In addition, the GPU scheduler 121 may periodically monitor a pod in which overload occurs and performance is degraded, among all pods registered at the GPU map, and may record a pod in which overload occurs on a pod record as shown in FIG. 12. FIG. 12 is a view illustrating an example of a source code created to record information on an overload pod when the pod in which overload occurs is found based on the GPU map.

The GPU map may include a GPU UUID, a pod ID, a graphics processing unit multi-process service (GPUMPS) count, a GPUMPS index, a GPUMPS process, a GPUMPS memory, a GPUMPS core, and a GPUMPS endtime, etc.

User input information on an application service, request resource information of a pod, and a history of executing of a pod that finishes performance may be recorded on the pod record.

Since an amount of data recorded on the pod record increases according to a frequency of data regarding the overload pod, the GPU scheduler 121 may increase a pod record-based scheduling weight according to the increase of the amount of data recorded on the pod record.

In addition, after the scheduling operation is performed, when there is a difference between a prediction value obtained before the scheduling operation and a real value obtained after the scheduling operation through comparison, the GPU scheduler 121 may add a weight to a prediction value of the next period of a pod having the difference by a difference value.

As described above, a GPU bottleneck phenomenon occurring in an application of a large-scale container environment may be reduced by processing partitioned allocation of GPU resources, rather than existing 1:1 allocation, through real-time GPU data analysis (application of a threshold) and synthetic analysis of GPU performance degrading factors, and GPU resources may be efficiently distributed through multilateral (multi-dimensional) data (metric) analysis and simultaneous analysis of use rates of a GPU configuration node and a GPU using application (pod). In addition, a deployment history information management function for rapid distribution of GPU resources and reduction of performance degrading factors may be supported, and weight data may be automatically updated and managed through record of a time of really performing deployed resources.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A cloud management method comprising:
    collecting, by a cloud management device, metric data regarding a GPU use state in a large-scale container platform environment;
    generating, by the cloud management device, a GPU map by analyzing the collected metric data; and
    performing, by the cloud management device, a scheduling operation for distributed deployment of GPU resources, based on the generated GPU map, including detecting an overload pod, having a degraded performance due to a reduced speed or lack of resources, based on the generated GPU map, and performing the scheduling operation using information regarding the detected overload pod,
    wherein after the scheduling operation is performed, when there is a difference between a prediction value obtained before the scheduling operation and a real value obtained after the scheduling operation by comparing, the cloud management method further comprises adding, by the cloud management device, a weight to a prediction value of a next period of a pod, in which the difference occurs,
    the weight being determined dependent on an amount of data recorded for the overload pod and a frequency of detecting the overload pod.

2. The cloud management method of claim 1, wherein performing the scheduling operation comprises:
    recording the information regarding the detected overload pod;

selecting an optimal candidate node for allocating all resources or sharing and allocating some of the resources of the overload pod, in replacement of the overload pod, based on the generated GPU map; and
performing the scheduling operation, based on the recorded information regarding the overload pod and information regarding the optimal candidate node.

3. The cloud management method of claim 2, wherein, when selecting the optimal candidate node, the cloud management device is configured to select one or more first nodes to which requested GPU resources are allocable, to calculate an appropriate score with respect to the selected first node, and to select a most appropriate node based on each appropriate score.

4. The cloud management method of claim 3, wherein the cloud management device is configured to detect occurrence of overload with respect to all pods registered at the GPU map periodically according to a pre-set first period, and, when a new pod is generated, to detect occurrence of overload with respect to the generated pod irrespective of whether the first period comes.

5. The cloud management method of claim 4, wherein the cloud management device is configured to iteratively perform the scheduling operation of GPU resources, based on the generated GPU map, periodically according to a pre-set second period, and
wherein the second period is relatively longer than the first period, so that the scheduling operation of GPU resources is performed based on information on the overload pod that is accumulatively recorded.

6. The cloud management method of claim 5, wherein the cloud management device is configured to select a second node having a history of failing to schedule, and to perform a rescheduling operation of GPU resources with respect to the selected second node periodically according to a pre-set third period.

7. The cloud management method of claim 3, wherein, when selecting the first node, the cloud management device is configured to calculate a number of available GPUs for each node, and to predict a memory usage of each pod included in each node, based on the metric data, and to select the first node to which the requested GPU resources are allocable, based on the calculated number of available GPUs for each node and a result of predicting the memory usage of each pod.

8. The cloud management method of claim 3, wherein, when selecting the optimal candidate node, the cloud management device is configured to select, as the optimal candidate node first, a first node included in a node having a smallest number of pods participating in allocation of GPU resources, among nodes to which a first node corresponding to a pre-set upper range of appropriate scores belongs.

9. A non-transitory computer-readable storage medium having a computer program recorded thereon that, when executed by a processor, cause the processor to perform a cloud management method, the method comprising:
collecting, by a cloud management device, metric data regarding a GPU use state in a large-scale container platform environment;
generating, by the cloud management device, a GPU map by analyzing the collected metric data; and
performing, by the cloud management device, a scheduling operation for distributed deployment of GPU resources, based on the generated GPU map, including detecting an overload pod, having a degraded performance due to a reduced speed or lack of resources, based on the generated GPU map, and performing the scheduling operation using information regarding the detected overload pod,
wherein after the scheduling operation is performed, when there is a difference between a prediction value obtained before the scheduling operation and a real value obtained after the scheduling operation by comparing, the method further comprises adding, by the cloud management device, a weight to a prediction value of a next period of a pod, in which the difference occurs,
the weight being determined dependent on an amount of data recorded for the overload pod and a frequency of detecting the overload pod.

10. A cloud management device comprising:
a communication unit configured to collect metric data regarding a GPU use state in a large-scale container platform environment; and
a processor configured to generate a GPU map by analyzing the collected metric data, and to perform a scheduling operation for distributed deployment of GPU resources, based on the generated GPU map, including detecting an overload pod, having a degraded performance due to a reduced speed or lack of resources, based on the generated GPU map, and performing the scheduling operation using information regarding the detected overload pod,
wherein after the scheduling operation is performed, when there is a difference between a prediction value obtained before the scheduling operation and a real value obtained after the scheduling operation by comparing, the processor is configured to add a weight to a prediction value of a next period of a pod, in which the difference occurs,
the weight being determined dependent on an amount of data recorded for the overload pod and a frequency of detecting the overload pod.

11. The cloud management device of claim 10, wherein, for performing the scheduling operation, the processor is configured to:
record the information regarding the detected overload pod;
select an optimal candidate node for allocating all resources or sharing and allocating some of the resources of the overload pod, in replacement of the overload pod, based on the generated GPU map; and
perform the scheduling operation, based on the recorded information regarding the overload pod and information regarding the optimal candidate node.

12. The cloud management device of claim 11, wherein, when selecting the optimal candidate node, the processor is configured to select one or more first nodes to which requested GPU resources are allocable, to calculate an appropriate score with respect to the selected first node, and to select a most appropriate node based on each appropriate score.

13. The cloud management device of claim 12, wherein the processor is configured to detect occurrence of overload with respect to all pods registered at the GPU map periodically according to a pre-set first period, and, when a new pod is generated, to detect occurrence of overload with respect to the generated pod irrespective of whether the first period comes.

14. The cloud management device of claim 13, wherein the processor is configured to iteratively perform the scheduling operation of GPU resources, based on the generated GPU map, periodically according to a pre-set second period, and wherein the second period is relatively longer than the first period, so that the scheduling operation of GPU resources is performed based on information on the overload pod that is accumulatively recorded.

15. The cloud management device of claim 14, wherein the processor is configured to select a second node having a history of failing to schedule, and to perform a rescheduling operation of GPU resources with respect to the selected second node periodically according to a pre-set third period.

16. The cloud management device of claim 12, wherein, when selecting the first node, the processor is configured to calculate a number of available GPUs for each node, and to predict a memory usage of each pod included in each node, based on the metric data, and to select the first node to which the requested GPU resources are allocable, based on the calculated number of available GPUs for each node and a result of predicting the memory usage of each pod.

17. The cloud management device of claim 12, wherein, when selecting the optimal candidate node, the processor is configured to select, as the optimal candidate node first, a first node included in a node having a smallest number of pods participating in allocation of GPU resources, among nodes to which a first node corresponding to a pre-set upper range of appropriate scores belongs.

* * * * *